March 7, 1961 C. F. KAEGEBEIN 2,973,742
EGG HANDLING DEVICE
Filed Sept. 11, 1959 3 Sheets-Sheet 1

INVENTOR.
CARL F. KAEGEBEIN
BY
Bean, Brooks, Buckley & Bean
ATTORNEYS

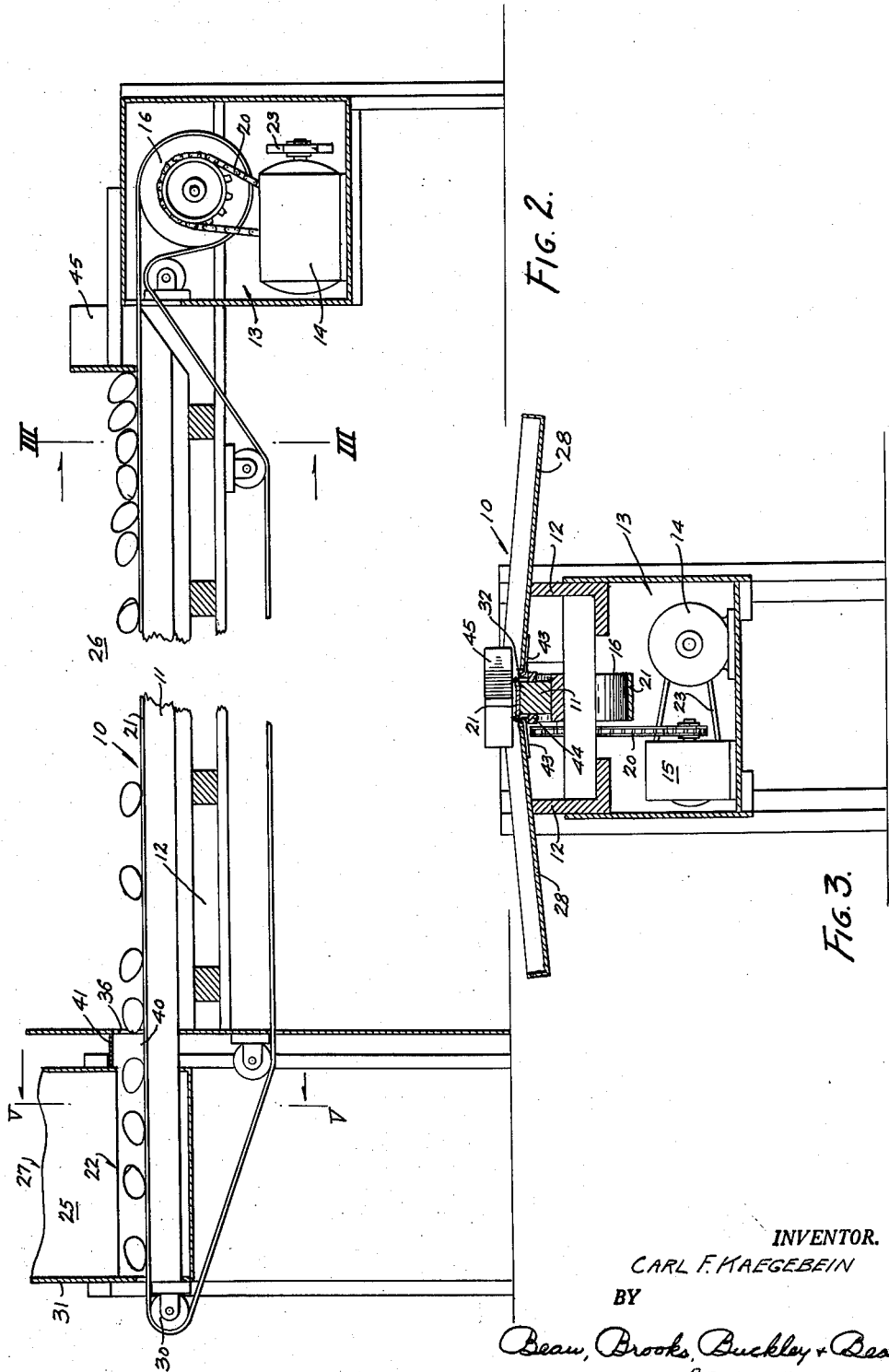

March 7, 1961   C. F. KAEGEBEIN   2,973,742
EGG HANDLING DEVICE

Filed Sept. 11, 1959   3 Sheets-Sheet 3

INVENTOR.
CARL F. KAEGEBEIN
BY
Bean, Brooks, Buckley & Bean
ATTORNEYS

2,973,742
EGG HANDLING DEVICE

Carl F. Kaegebein, Long Road, Grand Island, N.Y.

Filed Sept. 11, 1959, Ser. No. 839,412

2 Claims. (Cl. 119—48)

My invention relates in general to gathering and conveying devices for eggs and in particular to a device for gathering eggs from the egg receiving compartments of a number of aligned laying nests.

The principal object of my invention is to provide means for automatically gathering eggs from the egg receiving compartments of one or more laying nests and depositing them in suitable containers.

An object is to provide means for distributing the eggs on the containers as they are conveyed by the gathering means.

A further object is to provide a narrow egg conveying belt mounted in the egg receiving compartments and being inclined downwardly toward the rear of the compartments.

A further object is to elevate the edges of the belt as it passes through the egg gathering chamber, whereby a shallow trough will be provided keeping the eggs from rolling off the belt.

Moreover, the egg conveying belt of my device is of a width sufficient only to accommodate a single row of eggs, thereby holding the number of points of contact between the eggs to a minimum.

Furthermore, the egg receiving compartment is provided at its rear side with an opening disposed along the rear edge of the belt, whereby any broken eggs in the compartment will be automatically removed therefrom.

The above objects and advantages have been accomplished by the device shown in the accompanying drawings, of which:

Fig. 2 is a side sectional elevation of the same taken on line II—II of Fig. 1;

Fig. 3 is an enlarged fragmentary sectional elevation of the device taken on line III—III of Fig. 2;

Figure 1:
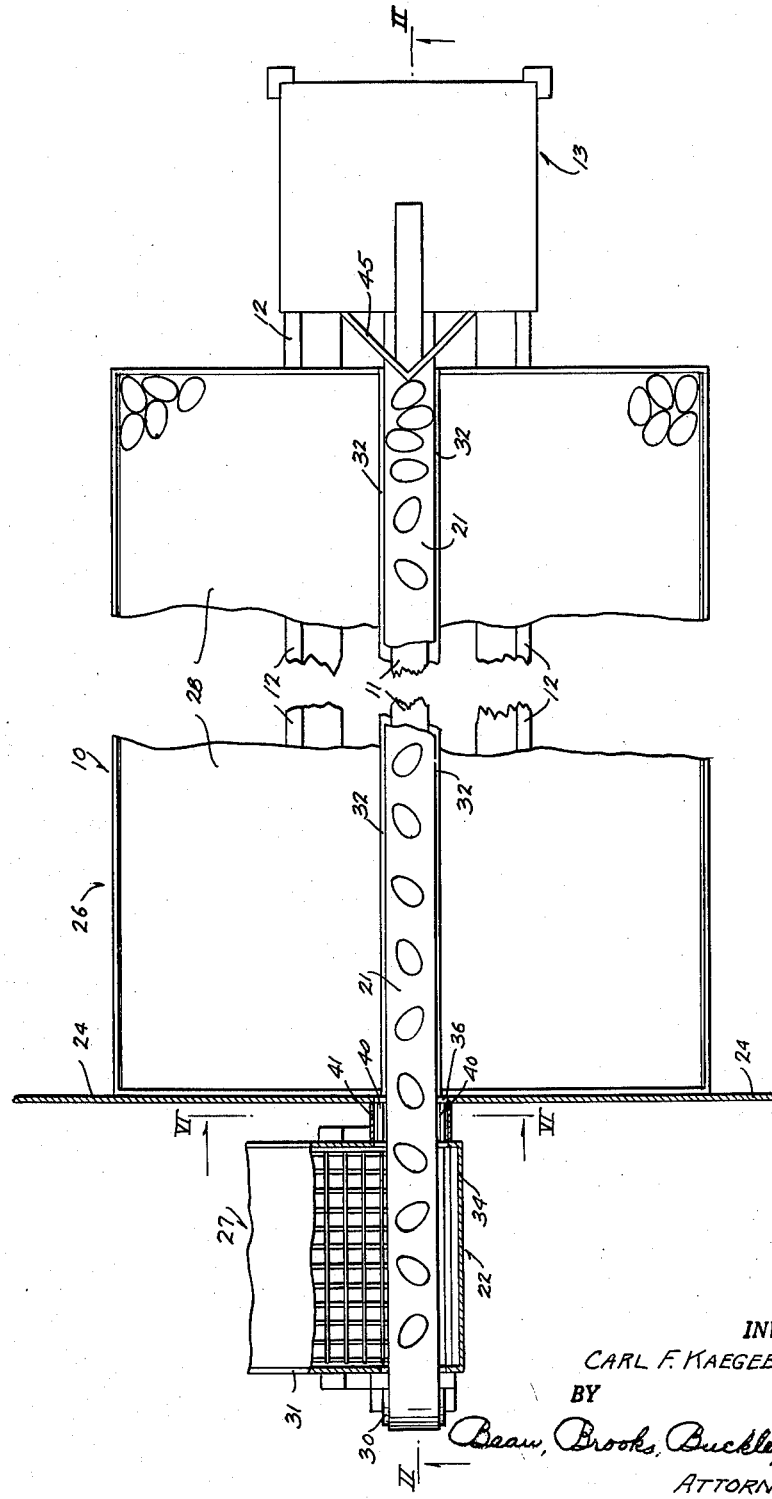
Fig. 1 is a plan view of my device with a portion broken away.
Figure 5:
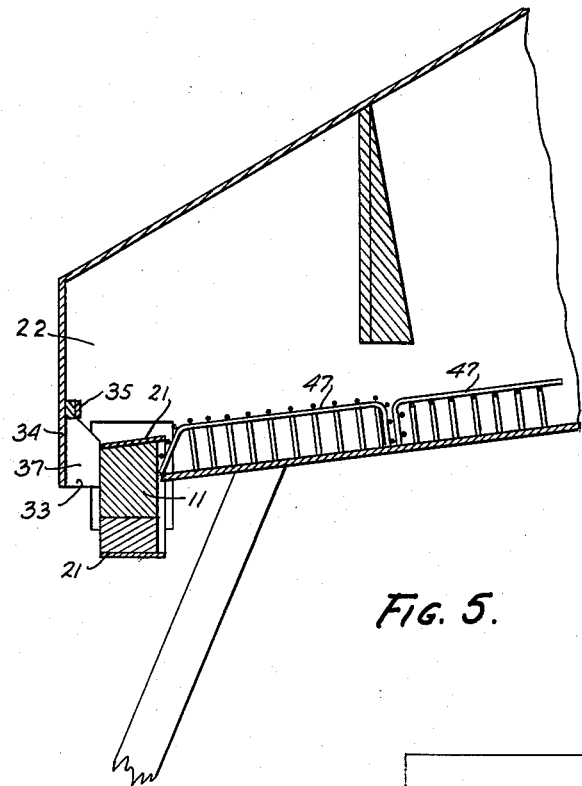
Fig. 5 is an enlarged sectional view taken on line V—V of Fig. 2.

My device comprises a gathering table 10 formed with a centrally arranged belt support 11 and side members 12. The power unit 13 of my device comprises an electric motor 14 attached to a speed reducing unit 15. The speed reducing unit is connected to a drive pulley 16 preferably by means of a chain 20 and the speed reducing unit is driven by means of a belt 23. An egg conveying belt 21 is disposed upon the belt support and is extended through the aligned egg receiving compartments 22 of the laying nests 27 and over and through a gathering table 10. The belt preferably extends through a partition or wall 24 separating the compartment 25 (Fig. 2) from the gathering chamber 26. The belt is driven by the power unit 13 located behind the gathering table and it passes over a return pulley 30 carried by the outer wall 31 of the egg receiving compartment farthest from the gathering chamber. The conveyor belt is wider than the belt support 11 and that portion of the support which lies within the gathering chamber is provided with oppositely arranged inverted U-shaped members 32 which extend above the upper surface of the support, whereby the outer edges of the belt will be elevated slightly so as to form a shallow trough for maintaining the eggs upon the belt while they are traveling through the chamber. In order that any broken eggs may be immediately removed from the belt, that portion of the belt support which is disposed across the egg receiving compartments 22 is preferably inclined downwardly as shown in Fig. 5, an open space 33 being provided between the rear edge of the belt and the back wall 34 of the compartment to allow the broken eggs to run off the belt and be disposed of. This space is maintained by means of spacer blocks 37 which engage the rear edge of the belt, and the rear edge of the belt in the compartment is preferably flush with the rear edge of the support. A bumper or buffer 35 of felt, rubber, or other flexible material, is carried by the rear wall 34 of the compartment so as to cushion the impact of the eggs as they are rolled out of the compartments onto the belt.

In the usual and preferred installations of devices of this nature, the laying nests are located in a compartment 25 which is separated from the egg gathering chamber 26 by a partition 24 and an opening 36 is provided in the partition for the passage of the belt. The belt support 11 extends through the wall and that portion of the support extending between the laying nests and the chamber is provided with two oppositely arranged guides 40 for preventing the eggs from rolling off the belt as they are traveling to the egg gathering chamber. A cover 41 carried by the support is hinged to a stationary member 42 for protecting the eggs as they pass through the wall.

Figure 4:
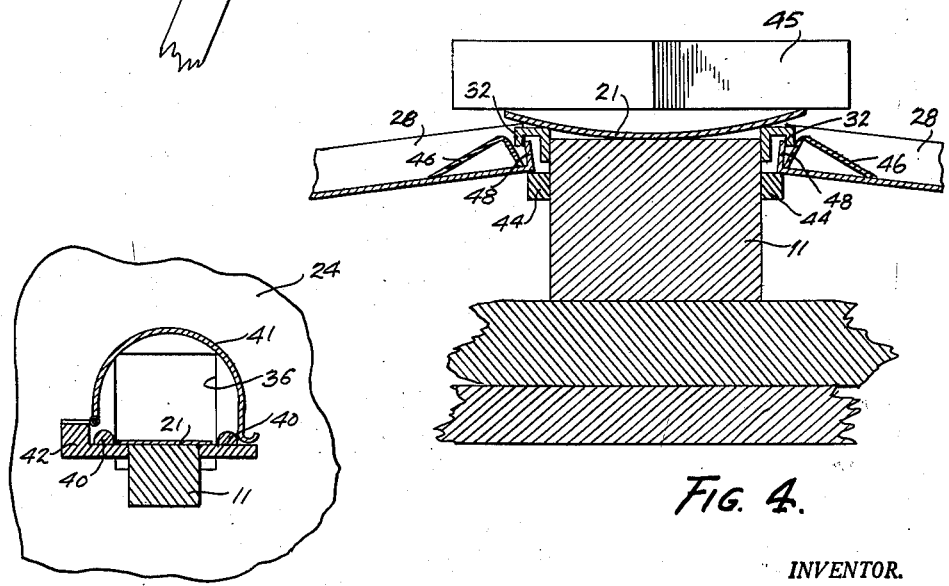
Fig. 4 is a greatly enlarged fragmentary sectional elevation of a slightly modified form, taken on line III—III of Fig. 2.
Figure 6:
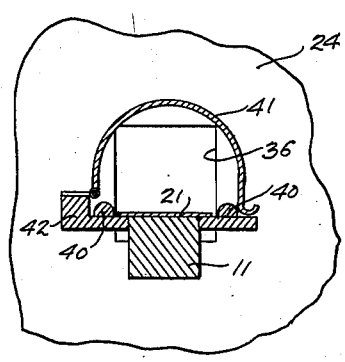
Fig. 6 is an enlarged sectional view of that portion of the belt and support lying between the partition and the adjacent laying nest, taken on line VI—VI of Fig. 1.

Arranged along each side of the conveyor belt 21 in the gathering chamber is a series of egg containers or trays 28 which can be made either of wood, as shown, or wire mesh. These egg containers are disposed along both edges of the belt support adjacent the belt support and are provided with inner hooked members 43 for engagement with the inverted U-shaped members 32. These containers have the members 43 hooked under the members 32 or, as shown in Fig. 4, the edges 48 of the trays may engage the members 32. The trays then are supported by container supports 44 fixed to the belt support 11 and by the side members 12 of the table. In order to distribute the eggs upon the containers as they are fed by the belt, a V-shaped deflector 45 is arranged at the end of the gathering table adjacent the power unit 13 and the eggs as they contact the tapered sides of the deflector will be pushed off the belt onto the containers at both sides thereof. The containers are inclined downwardly away from the belt so that the eggs when pushed off of the belt will roll down toward the lower edges of the containers. The gathered eggs may be removed by hand and placed into suitable receptacles, or the eggs deposited within the containers can be removed with the containers. As shown in Fig. 4, each of the containers may be provided with an egg receiving plate 46 which provides an inclined bottom portion which aids the eggs in rolling to the far end of the container.

It will be obvious that as the belt travels along the belt support, all of the eggs as they are laid in the nest will be deposited within the egg receiving compartment owing to the inclined wire floor 47 of the compartment. These eggs will, therefore, be rolled onto the belt and conveyed out of the compartment through the partition and into the gathering chamber. As the eggs are conveyed out of the compartment by the belt they will be carried by the shallow trough shaped portion of the belt through the gathering chamber and will successively engage the egg deflector. The deflector will push the eggs off the belt to one side or the other and will be deposited into the containers. When the container nearest the power unit is filled, the eggs will collect upon the belt until the next container receives them, and so on until all of the containers have been filled.

While but one egg receiving compartment is shown in the drawings, it is obvious that the conveyor belt is capable of servicing a great number of adjacent compartments. Furthermore, instead of mounting the conveyor belt within the egg receiving compartment proper, it may be located in a separate unit disposed adjacent the rear of the egg receiving compartment.

These and other modifications of the details herein shown and described may be made without departing from the spirit of the invention or the scope of the appended claims; and I do not wish, therefore, to be limited to the details herein shown and described.

Having fully disclosed and completely described my invention, and its mode of operation, what I claim as new is:

1. In combination with a poultry nest, means defining an egg receiving compartment adjacent to said nest, a narrow single egg belt conveyor along the rear side of said compartment, the top surface of said conveyor belt sloping to the rear, said compartment being provided with an opening along the rear edge of said conveyor belt, and a bumper rearwardly of said conveyor to hold the eggs on said conveyor.

2. In combination with a poultry nest, means defining an egg receiving compartment adjacent said nest, a narrow belt conveyor along the rear of said compartment, means providing an opening along the rear edge of said conveyor belt, said conveyor belt being of a width sufficient to support only a single egg and the top surface of said conveyor belt sloping downwardly to the rear, whereby broken eggs will run off said conveyor belt through said opening, and a bumper adjacent said rear edge of said downwardly sloping conveyor belt for retaining unbroken eggs thereon.

References Cited in the file of this patent

UNITED STATES PATENTS

| | | |
|---|---|---|
| 2,579,562 | Fruechtel | Dec. 25, 1951 |
| 2,617,384 | Tjaden et al. | Nov. 11, 1952 |
| 2,694,381 | Kaegebein | Nov. 16, 1954 |
| 2,745,379 | Schmidt | May 15, 1956 |